(12) United States Patent
Serizawa et al.

(10) Patent No.: US 6,799,079 B2
(45) Date of Patent: Sep. 28, 2004

(54) METHOD AND APPARATUS FOR CORRECTING POSITIONAL DEVIATION OF FINITE LINEAR ROLLING GUIDE

(75) Inventors: Yukio Serizawa, Susono (JP); Katsuji Gakuhari, Mishima (JP); Kazushi Kawatsu, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 182 days.

(21) Appl. No.: 10/059,320

(22) Filed: Jan. 31, 2002

(65) Prior Publication Data

US 2002/0107605 A1 Aug. 8, 2002

(30) Foreign Application Priority Data

Jan. 31, 2001 (JP) ........................................ 2001-021119

(51) Int. Cl.[7] .............................................. G05B 19/18
(52) U.S. Cl. ............................ 700/57; 700/60; 700/61; 700/63; 700/186; 700/188; 700/193; 700/302; 384/44; 384/51; 384/57; 318/638; 318/652; 318/687; 198/341.01
(58) Field of Search ............................. 700/56, 57, 60, 700/61, 63, 64, 186, 188, 193, 302, 192; 318/567, 569, 600, 638, 652, 671, 684, 686, 687; 248/550; 198/750.1, 341.01, 468.01; 384/43–45, 15, 13, 49–51, 55, 57; 74/490.09, 490.13; 72/250

(56) References Cited

U.S. PATENT DOCUMENTS

| | | | | |
|---|---|---|---|---|
| 4,484,287 A | * | 11/1984 | Gamo et al. ................. | 700/177 |
| 4,511,242 A | * | 4/1985 | Ashbee et al. ............... | 399/395 |
| 4,809,188 A | * | 2/1989 | Willits et al. ................ | 700/125 |
| 4,942,611 A | * | 7/1990 | Kunugi et al. ............... | 700/164 |
| 5,095,258 A | * | 3/1992 | Drits et al. .................. | 318/569 |
| 5,528,487 A | * | 6/1996 | Adachi et al. ................ | 700/57 |
| 5,726,542 A | * | 3/1998 | Ebihara ........................ | 318/35 |
| 6,286,055 B1 | * | 9/2001 | Yamazaki et al. ............. | 710/1 |
| 6,625,517 B1 | * | 9/2003 | Bogdanov et al. .......... | 700/193 |
| 6,698,581 B2 | * | 3/2004 | Steeber et al. .............. | 198/602 |
| 6,701,608 B2 | * | 3/2004 | Pigott et al. ................. | 29/713 |
| 6,708,402 B2 | * | 3/2004 | Hirano et al. ................ | 29/833 |
| 2002/0156544 A1 | * | 10/2002 | Koskovich et al. ........... | 700/56 |
| 2003/0028280 A1 | * | 2/2003 | Nemoto ....................... | 700/182 |

FOREIGN PATENT DOCUMENTS

| | | | | |
|---|---|---|---|---|
| DE | 3704619 A1 | * | 8/1988 | ........... G05B/19/19 |
| JP | 58135022 A | * | 8/1983 | ........... B65G/47/28 |

* cited by examiner

*Primary Examiner*—Anthony Knight
*Assistant Examiner*—Crystal J. Barnes
(74) *Attorney, Agent, or Firm*—Pillsbury Winthrop LLP (57) ABSTRACT

There is provided a finite type rolling guide deviation correcting method and system capable of detecting the deviation in relative position between a rolling guide and a movable body if the deviation in relative position increases, and automatically carrying out a correcting operation for returning the deviation in relative position to a normal positional relationship. The finite type rolling guide deviation correcting method corrects a relative positional relationship between a finite type rolling guide for guiding a reciprocating motion of a movable body and the movable body. This method comprises the steps of: detecting whether the rolling guide exists below one end portion of the movable body in a moving direction, of both end portions of the movable body in reciprocating directions; moving the movable body toward the other end portion at a low speed when it is detected that the rolling guide does not exist below the one end portion of the movable body in the moving direction; and correcting the deviation in relative position between the movable body and the rolling guide by moving tho movable body to a stroke end while forcing to stop of a row of the rolling guide in the vicinity of the stroke end.

12 Claims, 6 Drawing Sheets

PRIOR ART

METHOD AND APPARATUS FOR CORRECTING POSITIONAL DEVIATION OF FINITE LINEAR ROLLING GUIDE

BACKGROUND OF THE INVENTION

1. Field of the Invention

The present invention generally relates to a finite linear rolling guide for guiding a movable body, such as a table or saddle of a machine tool. More specifically, the invention relates to a method and an apparatus for carrying out a correcting operation for returning a relative positional relationship between a movable body and a finite type rolling guide to a normal positional relationship, when the relative position of the movable body to the finite linear rolling guide changes gradually to shift the finite type rolling guide from an appropriate position while the movable body continues a reciprocating motion.

2. Description of the Prior Art

Guides for movable bodies, such as tables and saddles of machine tools, include slide linear guides, static air pressure linear guides, static oil pressure linear guides and finite linear rolling guides. Of these guides, finite type rolling guides can ensure the rigidity of machines, and the number of auxiliary facilities required for finite linear rolling guides is smaller than that for static pressure guides, so that finite type rolling guides are effective for space saving for machines and are effectively used as ultraprecise machine elements. For that reason, finite linear rolling guides are often utilized as guide machine elements for small ultraprecise finishing machines.

Figure 7:
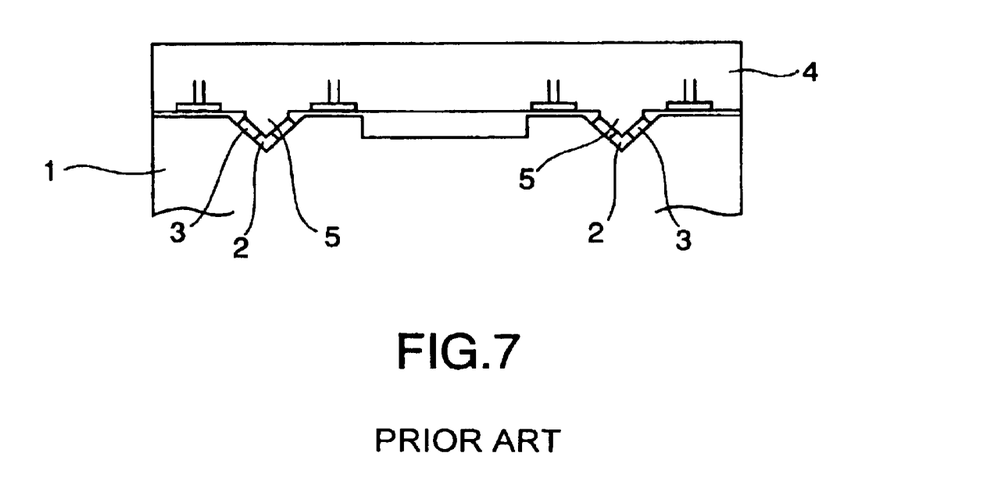
FIG. 7 is an illustration showing a conventional finite type rolling guide.

FIG. 7 shows an example of a conventional finite linear rolling guide which is disclosed in Japanese patent laid-open 2000-202727. In FIG. 7, a bed 1 of a machine tool is formed with V-shaped grooves 2, and rolling guides 3 are provided so as to extend along slant faces of the V-shaped grooves 2, respectively. On the bottom face of a table 4 as being a movable body 4, there are formed slide portions 5, each of which has a shape corresponding to a corresponding one of the V-shaped grooves 2. Each of the slide portions 5 is designed to contact a corresponding one of the rolling guides 3.

Each of the rolling guides 3 of this finite linear type comprises a bearing consisting of a combination of a retainer and a roller. In general, each of the rolling guides 3 is only supported on a corresponding one of the V-shaped grooves 2 without being fixed thereto.

Therefore, if the table 4 moves, there is caused a phenomenon that the rolling guides 3 move, little by little, in the opposite direction to the moving direction of the table 4 as a whole. If the reciprocating motion of the table 4 continues for a long time, the deviation in the relative positional relationship between the table 4 and the rolling guides 3 gradually increases. If this deviation in position is left as it is, there are some cases where the table 4 finally falls away from the rolling guides 3.

In order to prevent the deviation in position of the rolling guide 3, an operator monitors the operation of the machine, and when the deviation in position of the rolling guide 3 increases to some extent, the operator suspends the operation of the machine and manually moves and adjusts the table 4 so as to return the relative positional relationship between the rolling guide 3 and the table 4 to a normal positional relationship. There is also known a mechanical positioning mechanism capable of adjusting the position of the rolling guide along the V-shaped groove.

However, if the operator must manually adjust the deviation in position of the rolling guide 3, the operator must be always be on standby to prepare for the above mentioned problem. So there is a problem in that it is not possible to realize an unattended operation in the case of an ultraprecise machining which takes a lot of time to complete a process for a workpiece.

In addition, in ultraprecise finishing machines utilizing rolling linear guides, the feed rate of a movable body, such as a table, increases with the request for the increase of efficiency. In recent years, the feed rate is generally about 10 m/min. However, in the reciprocating motion of the movable body, the rate of the movable body in the approach route is high, whereas the rate of the movable body in the return route is low. Therefore, due to the large difference between the rates in the approach and return routes, the deviation in position of the rolling guide 3 is greater than that in conventional machines.

Moreover, if the rolling guide 3 is provided with a position adjusting mechanism, this position adjusting mechanism requires a rack, a pinion and a running block, and causes large vibrations during positioning, so that there is a problem in that such a position adjusting mechanism can not be applied to ultraprecise finishing machines.

SUMMARY OF THE INVENTION

It is therefore an object of the present invention to eliminate the aforementioned problems and to provide a finite linear rolling guide deviation correcting method and apparatus capable of detecting a relative positional relationship between a rolling guide and a movable body if the relative positional relationship increases, and automatically carrying out a correcting operation for returning the relative positional relationship to a normal positional relationship.

In order to accomplish the aforementioned and other objects, according to one aspect of the present invention, there is provided a method for correcting a relative positional relationship between a finite linear rolling guide and a movable body guided by the finite linear rolling guide, the finite linear rolling guide having a row of a plurality of rolling guides arranged in a direction of the reciprocating motion of the movable body, said method comprising the steps of: detecting whether the rolling guide remains beneath one end portion of the movable body in a forward direction, of both end portions of the movable body in moving directions; Determining that the positional deviation of the finite linear rolling guide increases when no rolling guide can not be detected; changing the moving direction of the movable body into the backward direction; correcting the deviation in relative position between the movable body and the finite linear rolling guide by moving the movable body to a stroke end of the movable body.

According to another aspect of the present invention, there is provided a apparatus for correcting a relative positional relationship between a finite linear rolling guide and a movable body guided by the finite linear rolling guide, the apparatus applied for the numerically controlled machine tool having a numerical control unit, a feed mechanism for the movable body, said apparatus comprising: a finite linear rolling guide having a row of a plurality of rolling guides arranged in a direction of the reciprocating motion of the movable body; detecting means disposed in both end portions of the movable body in moving directions, for detecting whether the rolling guide remains beneath one end portion of the movable body in a forward direction; correction control means for determining that the positional deviation of the finite linear rolling guide increases when no rolling guide can not be detected, and generating a correction signal to change the moving direction of the movable body into the backward direction so that the deviation in relative position between the movable body and the finite linear rolling guide is corrected; and servo control means for controlling a servo motor which drives the feed mechanism based on the correction signal provided by the correction control means.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, a preferred embodiment of a finite linear rolling guide deviation correcting method and apparatus according to the present invention will be described below.

Figure 1:
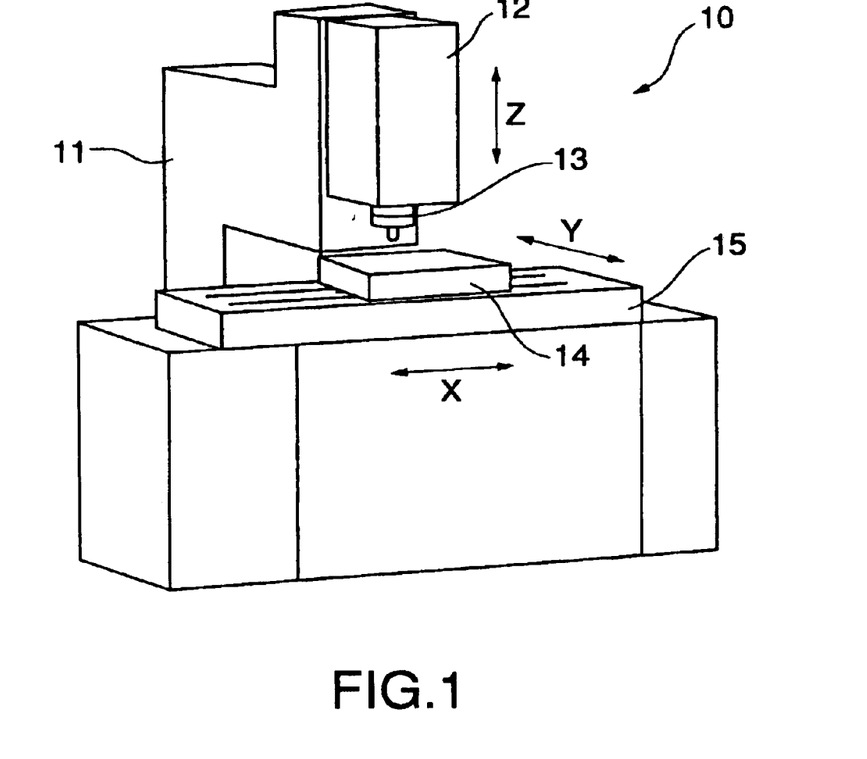
FIG. 1 is a perspective view of an example of a machine tool to which a finite type rolling guide deviation correcting method and system according to the present invention is applied.

FIG. 1 shows a numerical controlled precise vertical finish cutting machine 10 to which the present invention is applied. This numerically controlled precise vertical finishing machine 10 is a machine tool used for ultraprecise finish cutting process of parts, such as precision metal molds, optical parts and electronic parts. Reference number 11 denotes a column, and reference number 12 denotes a spindle head which is mounted on the column 11. Reference number 13 denotes a main spindle.

As shown in FIG. 1, in a base coordinate system, the control axis of a table 14 is X-axis, the control axis of a saddle 15 is Y-axis, and the control axis of the spindle head 12 is Z-axis. In this numerically controlled precise vertical finishing machine 10, finite type rolling linear guides are adopted as an X-axis guide for feeding the table 14 and a Y-axis guide for feeding the saddle 15.

Figure 2:
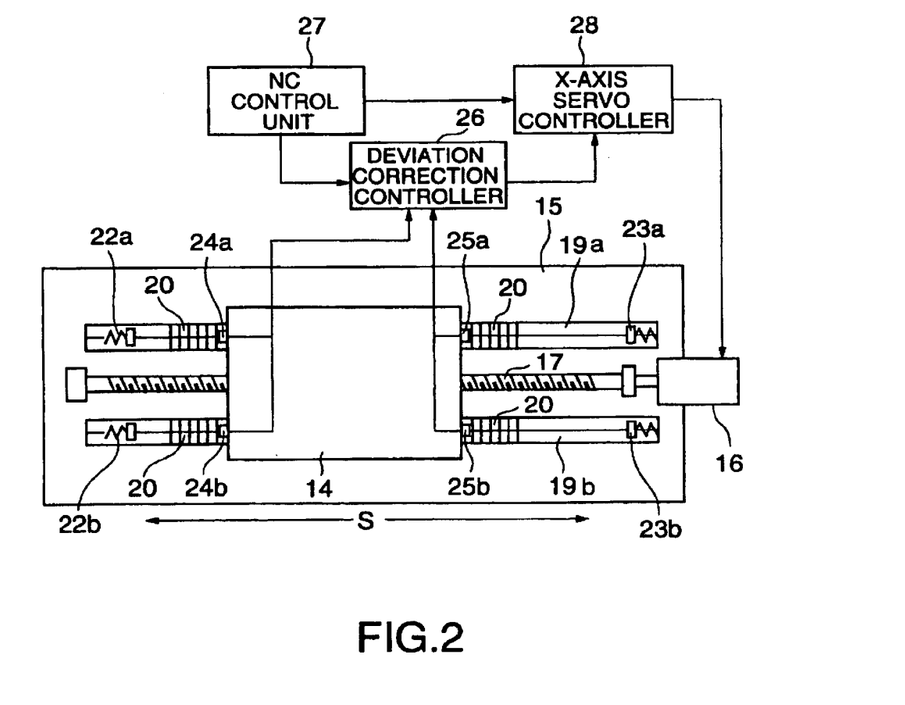
FIG. 2 is a diagram of a feed mechanism of a table which is provided with a finite type rolling guide.

FIG. 2 shows a feed mechanism and finite type rolling guide for the table 14.

Figure 3:
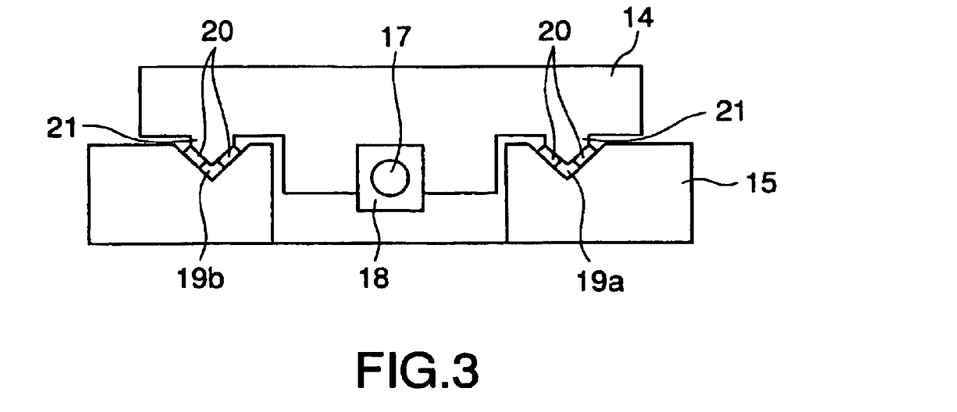
FIG. 3 is a sectional view of the table of FIG. 2.

In FIG. 2, reference number 16 denotes an X-axis servomotor. To the X-axis servomotor 16, a ball screw 17 is connected. As shown in FIG. 3, the ball screw 17 engages a ball nut 18 which is fixed to the bottom of the table 14. Therefore, the rotation of the X-axis servomotor 16 is converted into a feed linear motion by the ball screw 17 and ball nut 18 to be transmitted to the table 14.

On the top face of the saddle 15, two V-shaped grooves 19a and 19b extend in parallel. Each of the V-shaped grooves 19a and 19b is provided with a finite linear rolling guide 20 comprising a row of roller bearings. This finite linear rolling guide 20 comprises a plurality of cylindrical rollers which are retained by a retainer extending in longitudinal directions of a corresponding one of the V-shaped grooves 19a and 19b. The finite type rolling guide 20 substantially has the same construction as those of conventional finite type rolling guides. In addition, as shown in FIG. 3, the bottom of the table 14 is formed with slide portions 21, each of which has a shape corresponding to a corresponding one of the V-shaped grooves 19a and 19b. Each of the slide portions 21 is designed to contact a corresponding one of the rolling guides 20.

In FIG. 2, table stroke S is a reciprocating stroke of the table 14. On the top face of the table 14, a pair of shock absorbers 22a and 23a (22b and 23b) are provided in the vicinity of right and left end portions of the table stroke for each of the finite linear rolling guides 20.

In the right and left end portions in the reciprocating directions of the table 14, left end proximity switches 24a and 24b and right end proximity switches 25a and 25b are provided, respectively. In this preferred embodiment, each of these proximity switches is designed to detect whether a corresponding one of the rolling guides 20 remains beneath the light and left end portions o the table 14. If the V-shaped grooves 19a and 19b are distinguished from each other so as to be defined as front and rear V-shaped grooves, respectively, the left end proximity switches 24a and 24b may be distinguished from each other so as to be defined as a front-left proximity switch and a rear-left proximity switch, respectively, and the right end proximity switches 25a and 25b may be distinguished from each other so as to be defined as a front-right proximity switch and a rear-right proximity switch, respectively. Output signals from the proximity switches 24a, 24b, 25a and 25b are fed to a deviation correction controller 26 utilizing a program controller.

In FIG. 2, reference number 27 denotes a numerical control unit, and reference number 28 denotes an X-axis servo controller for controlling the X-axis servomotor 16 in accordance with a position command which is given from the numerical control unit 27.

Figure 4A:
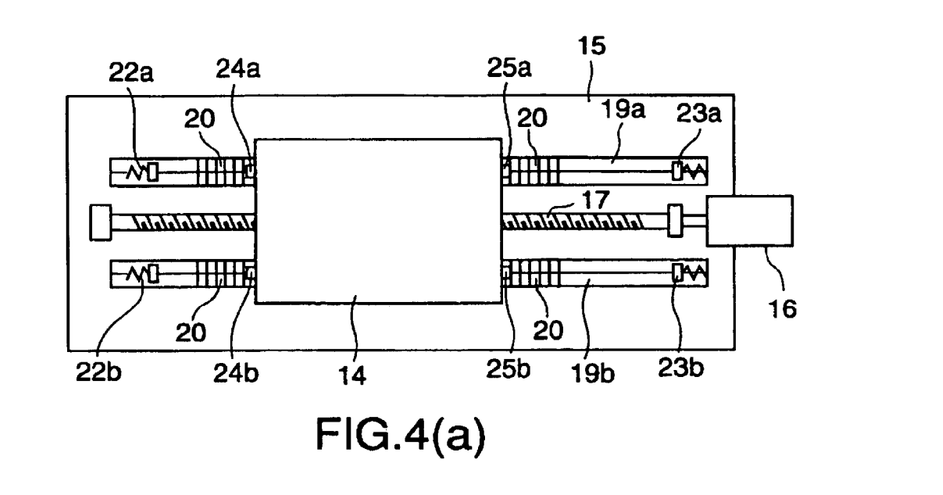
FIG. 4 is an illustration showing a relative positional relationship between the table and the finite type rolling guide.
Figure 4B:
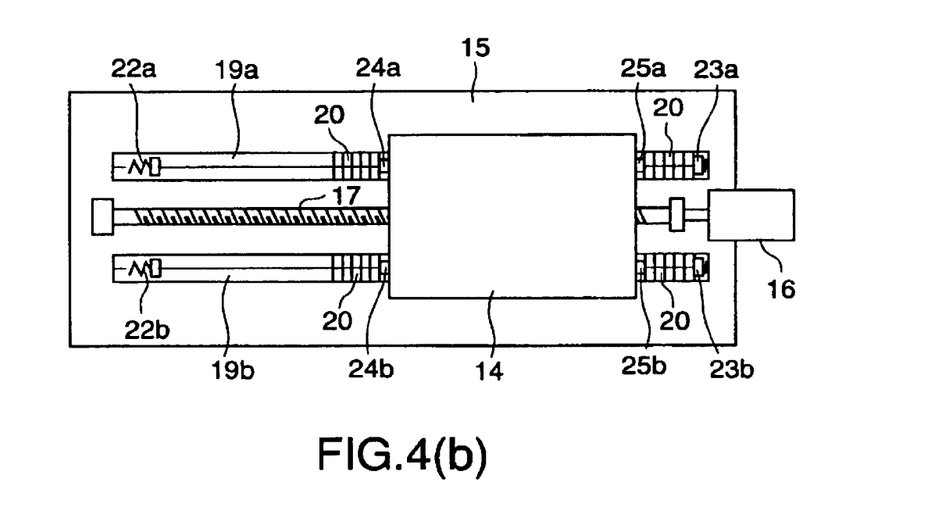

FIG. 4 shows a case where the relative positional relationship between the table 14 and the finite linear rolling guides 20 is normal. FIG. 4(a) shows a state that the table 14 is positioned at the central position of the reciprocating stroke S, and FIG. 4(b) shows a state that the table 14 has moved to the right end portion of the reciprocating stroke S. When the relative positional relationship between the table 14 and the finite type rolling guides 20 is normal, i.e., when the table 14 is appropriately placed on the rows of the finite linear rolling guides 20, the left end proximity switches 24a, 24b and the right end proximity switches 25a, 25b are turned on since the rolling guides 20 are always arranged beneath these proximity switches.

Figure 5A:
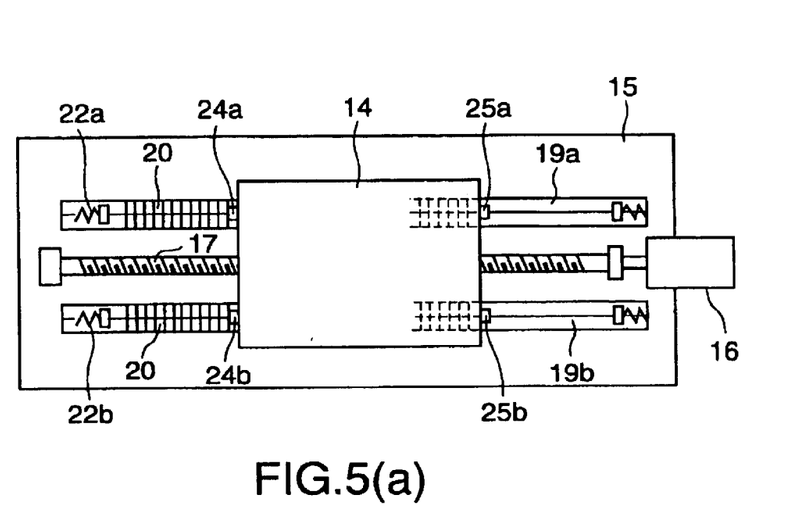
FIG. 5 is an illustration showing an operation for correcting the deviation in position of the finite type rolling guide.

On the other hand, FIG. 5(a) shows a case where the relative positional relationship between the table 14 and the finite linear rolling guides 20 is abnormal. That is, FIG. 5(a) shows a state that the table 14 excessively approaches the right ends of the rolling guides 20 after the deviation in position of the finite linear rolling guides 20 gradually increases as the reciprocating motion of the table 14 is repeated. In such a state, the rolling guides 20 do not exist beneath the right end proximity switches 25a and 25b, so that the right end proximity switches 25a and 25b are turned off.

Figure 5B:
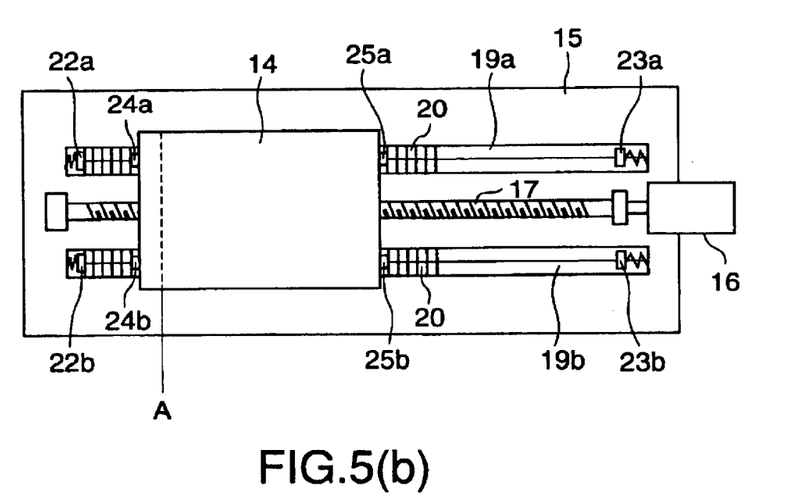

If the right end proximity switches 25a and 25b are thus turned off and if the deviation correction controller 26 detects that the deviation in position of the rolling guides 20 becomes large, the deviation correction controller 26 makes the table 14 to move rapidly to a position A shown by a dotted line as shown in FIG. 5(b), and then, changes the feed rate to a reduced rate to further move the table 14 from the position A to the left end of the stroke. The rows of the finite linear rolling guides 20 follow the rapid and reduced feeds of the table 14 to move to the left, and one ends thereof contact the shock absorber 22a and 22b to be smoothly stopped. Then, by moving the table 14 to the stroke end by the reduced feed, the relative positional relationship between the table 14 and the finite type rolling guides 20 can be returned to a normal state. Since the deviation in position of the rolling guides 20 can be corrected only by thus moving the table 14, it is not required to provide any mechanical mechanisms for modifying the positions of the rolling guides 20 unlike conventional systems, and it is possible to suitably apply the finite type rolling guides 20 to an ultra-precise finishing machine in this preferred embodiment.

Also if the table 14 excessively approaches the left ends of the rows of the rolling guides 20, the deviation correcting operation is the same, except that the feed direction of the table is opposite.

Figure 6:
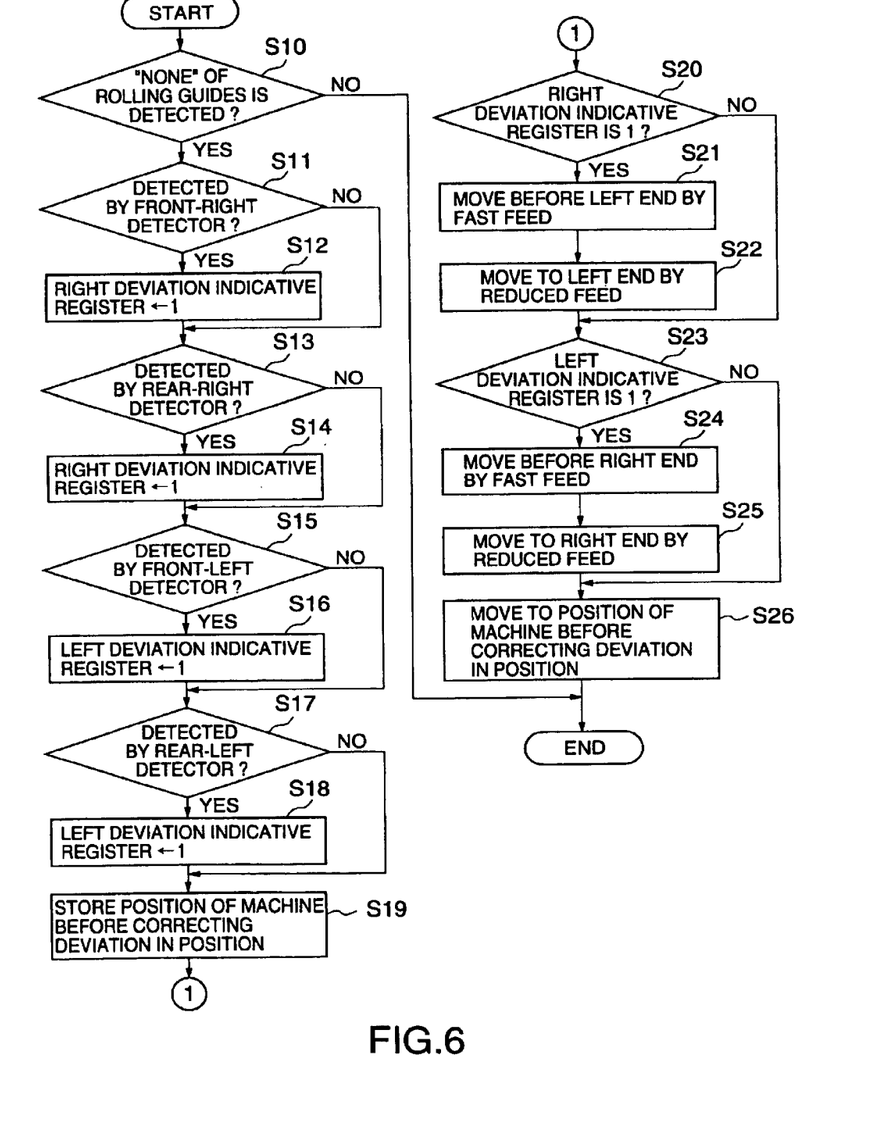
FIG. 6 is a flow chart showing an example of a program for executing the operation for correcting the deviation in position of the finite type rolling guide.

FIG. 6 shows an example of a macro program wherein the above described operation for correcting the deviation in position is incorporated into an NC program as a command. If the command for the operation for correcting the deviation in position is put in an appropriate block of the NC program, when the working continues for a predetermined time, the deviation in relative position between the table 14 and the rolling guides 20 can be automatically modified as follows.

First, if the command for the operation for correcting the deviation in position is executed, it is determined whether the rolling guides 20 are shifted so as not to remain beneath any switches of the left end proximity switches 24a, 24b and the right end proximity switches 25a, 25b (step S10). If all of the switches remain being turned on (no at step S10), it is determined that it is not established that "none" of the rolling guides exists, so that it is determined that the deviation in position is not caused. Then, the operation for correcting the deviation in position ends.

On the other hand, for example, if the front-right proximity switch 25a and the rear-right proximity switch 25b are turned off as a result of the fact that the rows of the rolling guides 20 excessively move to the left as shown in FIG. 5(a), the routine goes from step 511 to step S12 and from step S13 to step S14, so that a right deviation indicative register is set so as to have a value of 1. Then, the position of the table 14 at which the deviation in position of the rolling guides 20 has been detected is stored (step S19).

Subsequently, at step S20, the deviation correction controller 26 provides a signal with the X-axis servo controller 28 to move the table 14 to the position A, which is shown by the dotted line, by the rapid feed since the value of the right deviation indicative register is 1. Then, the deviation correction controller 26 provides a signal with the X-axis servo controller 28 to change the feed rate to the low speed, and to move the table 14 from the position A to the left end of the stroke, at step S21. After the relative positional relationship between the rows of the rolling guides 20 and the table 14 is thus modified to a normal state, the table 14 is returned to a position before the operation for modifying the deviation in position as shown in FIG. 5(a), at step S26.

Similarly, if the front-left proximity switch 24a and the rear-left proximity switch 24b are turned off as a result of the fact that the rows of the rolling guides excessively move to the left, the routine goes from step S15 to step S16 and from step S17 to step S18, so that a left deviation indicative register is set so as to have a value of 1. Then, the position of the table 14 at which the deviation in position of the rolling guides 20 has been detected is stored (step S19).

Subsequently, at step S23, the deviation correction controller 26 provides a signal with the X-axis servo controller 28 to move the table 14 before the right end of the stroke by the rapid feed since the value of the left deviation indicative register is 1, at step S24. Then, the deviation correction controller 26 generates a signal to change the feed rate to the low speed, and to move the table 14 to the left end of the stroke, at step S25. Thus, the relative positional relationship between the rows of the rolling guides 20 and the table 14 is modified to a normal state. Furthermore, according to the above described program, for example, even if only the front-right proximity switch is turned of as a result of the fact that only the row of the rolling guide 20 in the front V-shaped groove 19a is shifted, the operation for modifying the deviation in position is designed to be similarly carried out.

If the operation for modifying the deviation in position is thus incorporated into a working program as a command, when the deviation in position is caused, the modifying operation for returning to the normal positional relationship is automatically carried out without the need of the operator's monitoring. Therefore, even in the case of an ultraprecise working which takes a lot of time to work a workpiece, it is possible to carry out an unattended automated working without taking care of the deviation in position of the rolling guides.

As described above, according to the present invention, if the deviation in relative position between the rolling guides and the movable body increases, this can be detected to automatically carry out the correcting operation for returning the relative positional relationship to the normal positional relationship.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for correcting a relative positional relationship between a linear track guide and a movable body guided by the linear track guide, the linear track guide having a plurality of rolling guides arranged in a direction of a reciprocating motion of the movable body, said method comprising:

detecting whether the track guide is beneath an end portion of the movable body in a forward direction; and
    if it is detected that the track guide is not beneath the end portion of the movable body:
        changing a moving direction of the movable body to a backward direction, and correcting the positional deviation between the movable body and the linear track guide by moving the movable body to a stroke end of the movable body.

2. A method according to claim 1, further comprising:
restraining forcibly an end of the linear track guide in a vicinity of the stroke end from moving in a same direction with the movable body when the movable body is moved to the stroke end.

3. A method according to claim 1, wherein said correcting the positional deviation between the movable body and the linear track guide includes moving the movable body at a high feed rate to reach a predetermined speed changing point, and then moving the movable body at a low feed rate to the stroke end.

4. An apparatus for correcting a relative positional relationship between a linear track guide and a movable body guided by the linear track guide, the apparatus being used in a numerically controlled machine tool having a numerical control unit, a feed mechanism for the movable body, said apparatus comprising:

a linear track guide having a plurality of rolling guides arranged in a direction of a reciprocating motion of the movable body;

a plurality of detectors disposed at both end portions of the movable body, said plurality of detectors being configured to detect whether the track guide is beneath an end portion of the movable body in a forward direction;

a correction controller configured to determine when it is detected that the track guide is not beneath an end portion of the movable body in the forward direction, and configured to generate a correction signal to change a moving direction of the movable body to a backward direction to correct the positional deviation between the movable body and the linear track guide; and a servo controller adapted to control a servo motor, said servo motor being configured to drive the feed mechanism based on the correction signal provided by the correction controller.

5. An apparatus according to claim 4, the apparatus further comprising a shock absorber configured to restrain forcibly an end of the track guide in a vicinity of a stroke end from moving in a same direction with the movable body.

6. An apparatus according to claim 4, wherein said correction controller is configured to generate a signal that instructs the movable body to move at a high feed rate to reach a predetermined changing point, and then to move at a low feed rate to a stroke end.

7. An apparatus according to claim 4, wherein said correction controller is configured to store information on a position where the track guide ends relative to the end portion of the movable body, and configured to generate a signal that instructs the movable body to return to a detected position of the movable body after completion of correcting the positional deviation between the movable body and the linear track guide.

8. An apparatus according to claim 4, wherein the numerical control unit is configured to execute a program including a macro-instruction comprising procedures for correcting the positional deviation of the linear track guide.

9. An apparatus according to claim 4, wherein said movable body includes one of a table and a saddle of a numerically controlled precise machine tool.

10. An apparatus according to claim 4, wherein said linear track guide comprises a groove.

11. An apparatus according to claim 10, wherein said groove has a V-shape.

12. An apparatus according to claim 11, wherein said plurality of rolling guides are disposed on opposite faces of said groove.

* * * * *

UNITED STATES PATENT AND TRADEMARK OFFICE
CERTIFICATE OF CORRECTION

PATENT NO. : 6,799,079 B2
DATED : September 28, 2004
INVENTOR(S) : Serizawa et al.

It is certified that error appears in the above-identified patent and that said Letters Patent is hereby corrected as shown below:

Title page,
Item [30], Foreign Application Priority Data, replace
"Jan. 31, 2001 (JP) ........................... 2001-021119" with
-- Jan. 31, 2001 (JP) ........................... 2001-024119 --

Signed and Sealed this

Twenty-fifth Day of January, 2005

JON W. DUDAS
*Director of the United States Patent and Trademark Office*